United States Patent
Hecht et al.

(10) Patent No.: US 6,647,775 B1
(45) Date of Patent: *Nov. 18, 2003

(54) DEVICE FOR MEASURING AT LEAST ONE PARAMETER OF A FLOWING MEDIUM

(75) Inventors: Hans Hecht, Korntal-Muenchingen (DE); Gerhard Hueftle, Aspach (DE); Thomas Lenzing, Benningen (DE); Manfred Strohrmann, Karlsruhe (DE); Wolfgang Mueller, Rutesheim (DE); Dieter Tank, deceased, late of Kornwestheim (DE), by Eva and Hans Tank, legal heirs; Holger Krebs, Erdmannhausen (DE); Uwe Konzelmann, Asperg (DE); Markus Sippel, Schwieberdingen (DE); Horst Kubitz, Steinheim/Murr (DE); Henning Marberg, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

This patent is subject to a terminal disclaimer.

(21) Appl. No.: 09/831,153

(22) Filed: Oct. 19, 2001

(30) Foreign Application Priority Data

Sep. 7, 1999 (DE) .......................................... 199 42 511

(51) Int. Cl.⁷ ................................................. G01F 1/68
(52) U.S. Cl. .................................... 73/202.5; 73/204.21
(58) Field of Search ........................... 73/204.11, 202.5, 73/202, 204.21, 204.22

(56) References Cited

U.S. PATENT DOCUMENTS

| 4,433,576 | A | * | 2/1984 | Shih et al. | ................ 73/204.21 |
| 4,916,948 | A | * | 4/1990 | Inada et al. | ................ 73/202.5 |
| 6,234,015 | B1 | * | 5/2001 | Hamada et al. | ............ 73/202.5 |

FOREIGN PATENT DOCUMENTS

| DE | 2408121 | * | 6/1979 | ............. G01F/1/68 |
| EP | 708315 | * | 4/1996 | ............. G01F/1/68 |

* cited by examiner

Primary Examiner—Harshad Patel
(74) Attorney, Agent, or Firm—Ronald E. Greigg

(57) ABSTRACT

In devices for measuring the mass of aspirated air of an internal combustion engine, for instance, via a line, it is already known to provide a tubular body inside this line and to provide a temperature-dependent measuring element inside the tubular body. In order that dirt particles and liquid droplets entrained by the aspirated air will be kept away from the measuring element, in accordance with the invention, a protective screen is disposed inside the tubular body, upstream of the measuring element; the screen extends in inclined fashion in the flow direction, and dirt particles and liquid droplets are deposited on it and carried to a downstream end of the protective screen, so that via an outflow opening they can reach the inner conduit wall of the tubular body and be made to bypass the measuring element.

12 Claims, 4 Drawing Sheets

DEVICE FOR MEASURING AT LEAST ONE PARAMETER OF A FLOWING MEDIUM

CROSS RELATED TO RELATED APPLICATION

This application is a 35 USC 371 application of PCT/DE 00/03044 filed on Sep. 5, 2000.

FIELD OF THE INVENTION

The invention is based on a device for measuring at least one parameter of a medium flowing in a line, and particularly for measuring a parameter of aspirated air in an internal combustion engine.

BRIEF DESCRIPTION OF THE PRIOR ART

A device is already known (German Patent Disclosure DE 197 35 664 A1) in which a measuring element for measuring a parameter of air flowing in a line is disposed inside a tubular body through which a medium (air) flows. The upstream end of the tubular body extends as far as the inside of a filter chamber, where it has insertion openings on the jacket face, to prevent the imposition of dirt particles or water droplets on the measuring element. Especially if the air is quite dirty and there is a high proportion of water in the aspirated air of the engine, the danger exists that the air filter will become saturated with water, which then passes through the filter mat and will thus entrain dirt particles. On the downstream side of the air filter which is the actual clean side, there is then the danger that the aspirated air will again entrain dirt particles and water droplets from the filter surface that are then deposited undesirably on the measuring element and cause incorrect measurements or even failure of the measuring element. The tubular body in the prior art, by the disposition of the insertion openings on jacket face, lessens the risk of deposits on the measuring element, but this embodiment causes an undesired pressure drop that leads to a loss of measurement sensitivity.

From German Patent DE 44 07 209 C2, a measurement body for measuring the mass of aspirated air is known that can be inserted into the clean conduit of the intake line of an internal combustion engine and has a flow conduit which is composed essentially of a measurement conduit that narrows in the flow direction and an S-shaped deflection conduit adjoining it. The measuring element is disposed in the narrowing measurement conduit. The measuring element can, as is known from German Patent Disclosure DE 43 38 891 A1, for instance, be embodied as a micromechanical sensor part with a dielectric diaphragm.

SUMMARY AND ADVANTAGES OF THE INVENTION

The device of the invention has the advantage over the prior art that in a simple way, the imposition of dirt particles and liquid on the measuring element is prevented, without causing disadvantageous pressure losses. While the dirt particles and liquid droplets entrained by the medium, such as the aspirated air of an internal combustion engine, are trapped by the protective screen and diverted into a region of the air flow, or the inner conduit wall, that does not strike the measuring element, the flowing aspirated air passes virtually unhindered through the protective screen to reach the measuring element.

One possible way of diverting dirt particles and liquid droplets in a desired direction is advantageously obtained if the protective screen extends in inclined fashion in the flow direction.

It is advantageous, to provide an open outflow opening between a downstream end of the protective screen and an inner conduit wall of the flow conduit, as a result of which the liquid caught by the protective screen, with any dirt particles the liquid may contain, reaches a wall region of the tubular body, where it is entrained downstream by the flowing air while still adhering to the wall.

It is also advantageous that the measuring element is disposed in a measurement body that protrudes into the flow conduit, and a protective screen is located entirely or only partly upstream of the measurement body, so that liquid droplets and dirt particles will be reliably caught by the protective screen and detoured or diverted into the peripheral region of the tubular body. It is also advantageous if the measuring element is disposed in a measurement body, which extends along a longitudinal axis and which protrudes through an insertion opening in a first wall portion of the tubular body into the flow conduit in the direction of a second wall portion of the tubular body, and the protective screen defines a screen face which forms an angle of <90° with the longitudinal axis and is inclined in the direction of the second wall portion, so that the liquid droplets and dirt particles diverted from the protective screen are made to bypass the measurement body, below or beside it.

In a further advantageous feature, the measuring element is disposed in a measurement body, which extends along a longitudinal axis and which protrudes through an insertion opening in a first wall portion of the tubular body into the flow conduit in the direction of a second wall portion of the tubular body, and the protective screen defines a screen face, which extends approximately parallel to the longitudinal axis, so that liquid droplets and dirt particles diverted from the protective screen are made to bypass the measurement body laterally.

To assure the most homogeneous possible flow at the measuring element, it is advantageous to dispose a flow rectifier in the line, upstream and/or downstream of the tubular body.

To make the flow more uniform, advantageously, between an inner wall of the line and the tubular body, at least two flat struts are provided, oriented in the flow direction and transversely to the flow direction.

It is also advantageous to provide a suction extraction opening, upstream near a downstream end of the protective screen, leading to the line in the wall of the tubular body, by means of which line the liquid droplets and dirt particles diverted from the protective screen can be carried immediately out of the tubular body.

BRIEF DESCRIPTION OF THE DRAWINGS

Other features and advantages of the invention will be apparent from the detailed description contained below, taken with the drawings, in which.

DESCRIPTION OF THE PREFERRED EMBODIMENTS

Figure 1:
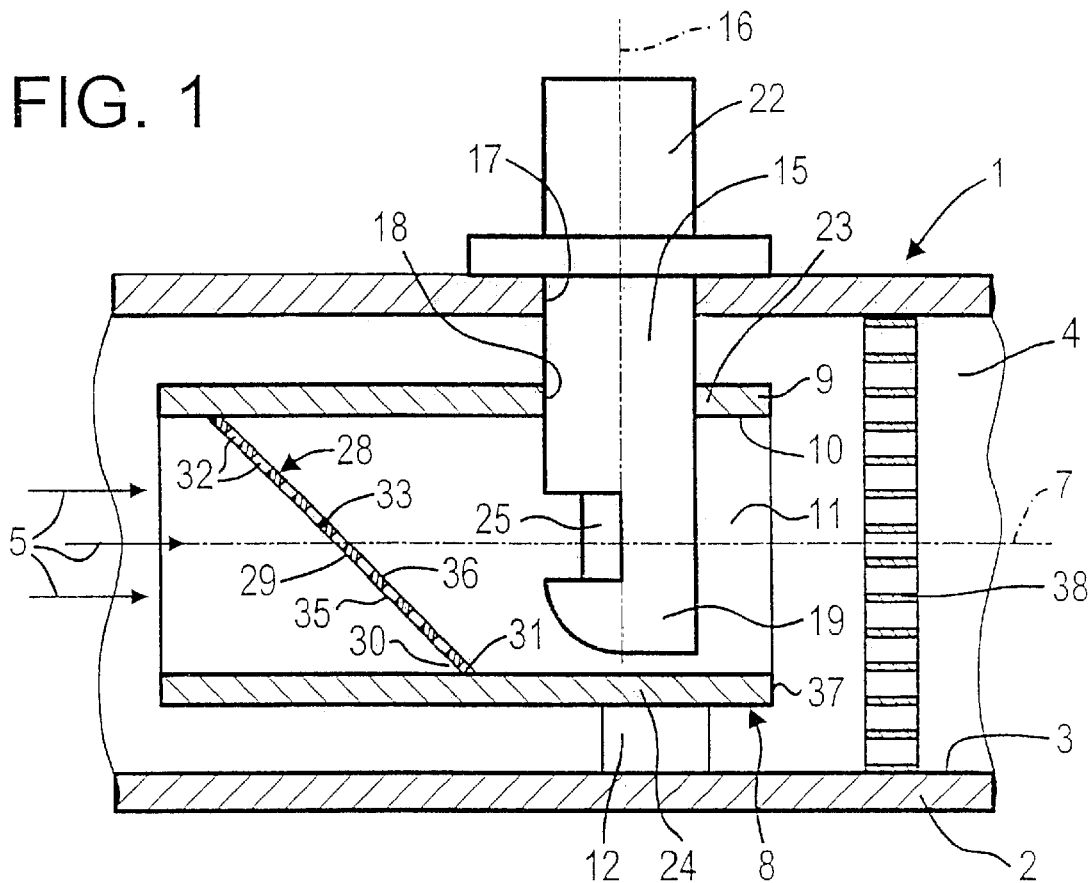
FIG. 1 is a sectional view showing a first exemplary embodiment of a device for measuring the mass of a flowing medium.

In FIG. 1, a first exemplary embodiment of a device embodied according to the invention for measuring at least one parameter of a medium flowing in a line, in particular the aspirated air mass of an internal combustion engine, is shown in a fragmentary sectional view, which is limited to the elements that are essential within the context of the invention. Reference numeral 1 indicates a line that either can form a direct portion of the intake tube of the engine or is an independent component that can be made to communicate with the engine intake tube. In either case, the line 1 is located downstream of an air filter, not shown, on its so-called clean-room side. The air filter serves to filter the aspirated air of the engine of a motor vehicle and is meant to prevent the entry of dirt particles or liquid into the intake tube as completely as possible.

The line 1 has a line wall 2, which has an inner wall surface 3 with which it surrounds the flow conduit 4, through which the aspirated air of the engine flows in the flow direction 5 represented by arrows. Disposed in the line 1 is a tubular body 8, which is oriented in the flow direction 5 and for instance extends concentrically to the center line 7 of the line 1. The tubular body 8 has a wall 9, which with an inner conduit wall surface 10 defines a flow conduit 11 in the tubular body 8, by way of which conduit some of the air aspirated in the flow direction 5 flows. The tubular body 8 is held by at least two struts 12, for instance, which extend between the inner wall 3 of the line 1 and the wall 9 of the tubular body 8 transversely to the flow direction 5, and which have a flat, platelike shape. On the one hand, the struts 12 not only retain the tubular body 8 in the air flow between the line 1 and the tubular body 8 but also increase the pressure drop, so that the quantity of air flowing through the flow conduit 11 increases, and on the other, the struts 12 bring about an intentional rectification of the flow of aspirated air.

The air mass aspirated by the engine is arbitrarily variable by means of a throttle valve, not shown, downstream of the tubular body 8 in the engine intake tube. One parameter of the flowing medium to be measured can be the mass flowing per unit of time (flow rate) of the flowing medium, such as the aspirated air mass of an internal combustion engine. For ascertaining the aspirated air mass of the engine, a measurement body 15 is provided, which is embodied as essentially elongated and blocklike and which extends along a longitudinal axis 16. The longitudinal axis 16 extends substantially perpendicular to the center line 7 of the line and thus to the flow direction 5 as well. The measurement body 15 is inserted partway through a retaining opening 17 in the line wall 2 and through an insertion opening 18 in the wall 9 of the tubular body 8, and with a measurement end 19 protrudes into the flow conduit 11. A plug end 22 of the measurement body 15, receiving the electrical terminals, for instance in the form of plug prongs, remains outside the line 1. The insertion opening 18 of the tubular body 8 is embodied in a first wall portion 23, opposite which, in the direction of the longitudinal axis 16, is a second wall portion 24. A measuring element 25 is provided in a known way in the measurement end 19 of the measurement body 15; this measuring element is in contact with the air flowing through the flow conduit 11, and by means of it the air mass aspirated by the engine is determined. The measuring element 25 can be embodied in a known manner, for instance in the form of thermally coupled, temperature-dependent resistors. In particular, as shown for instance in DE 43 38 891 A1, it is possible to embody the measuring element 25 as a micromechanical component, which has a dielectric diaphragm on which the resistor elements are embodied.

Other parameters of the flowing medium that are to be measured are for instance its temperature, pressure, and the like. To that end, the measuring elements 25 can by way of example be embodied as in German Patent Disclosures DE 42 37 224 A1, DE 43 17 312 A1, DE 197 11 939 A1, or DE 197 31 420 A1.

Figure 7:
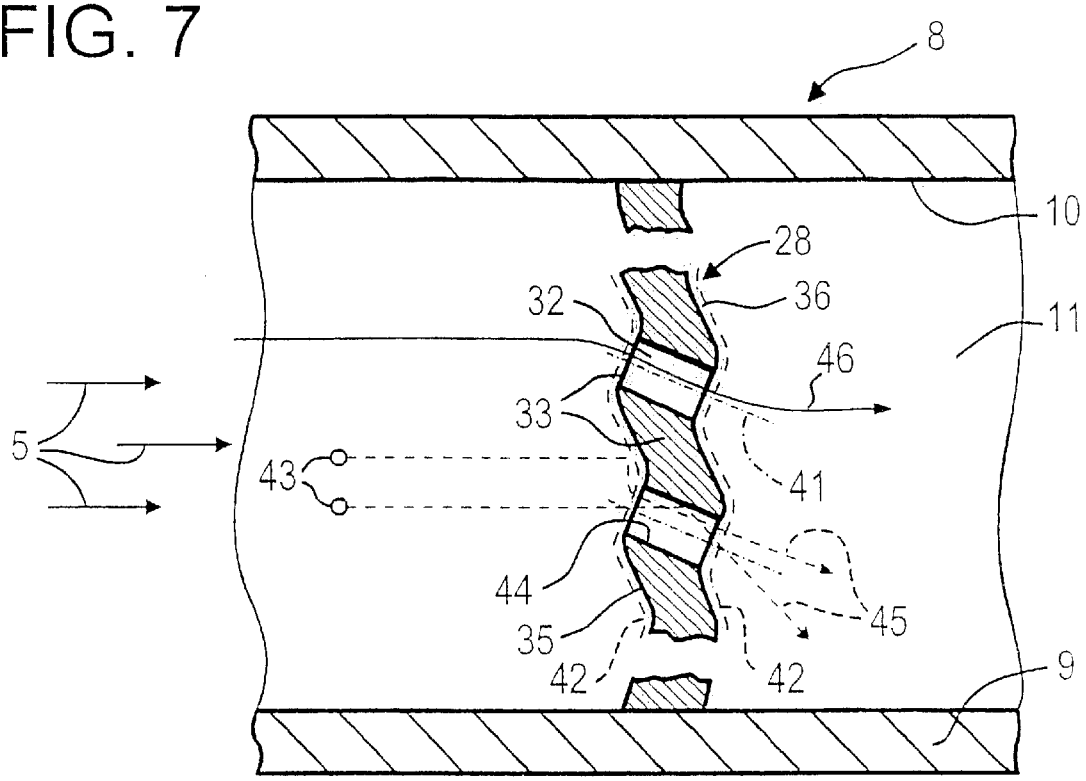
Figure 8:
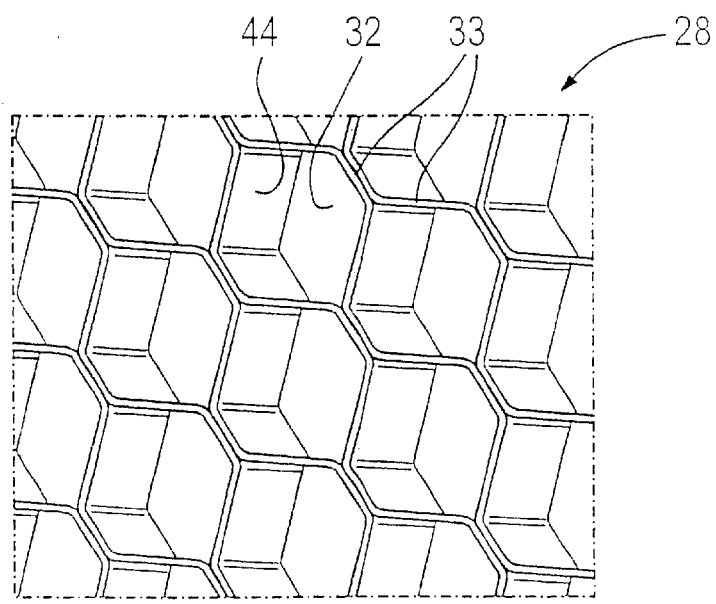

To prevent the measuring element 25 from being undesirably acted upon by dirt particles or liquid, a protective screen 28 is disposed at least partly upstream of the measuring element 25, inside the flow conduit 11 of the tubular body 8. The protective screen 28 has a circular or elliptical-oval shape, for instance, and presents a screen face 29, facing counter to the aspirated air. The protective screen 28 in the first exemplary embodiment extends from the first wall portion 23 of the tubular body 8 to the second wall portion 24, and by way of example it is inclined relative to the longitudinal axis 16 and the flow direction 5, or the center line 7 of the line, in such a way that the screen face 29 extends in inclined fashion in the flow direction 5 and forms an angle that is less than 90° with the longitudinal axis 16. In the first exemplary embodiment, the protective screen 28 is disposed such that it is located entirely upstream of the measuring element 25. However, as shown for the second exemplary embodiment in FIG. 2, the protective screen 28 can also be disposed such that it is located only partly upstream of the measurement body 15. Because of the inclination of the protective screen 28, the protective screen 28 has a downstream end 30, which in the first exemplary embodiment is oriented toward the second wall portion 24 of the tubular body 8. Between the downstream end 30 and the inner conduit wall 10 of the tubular body 8, an open outflow opening 31 is provided, which is either formed by providing that the downstream end 30 ends in spaced-apart fashion from the inner conduit wall 10, or in that, although the downstream end 30 does protrude as far as the inner conduit wall 10, nevertheless the outflow opening 31 is recessed out of the protective screen 28 or the inner conduit wall 10. To form the protective green 28, both a tight-mesh wire cloth and a thin plate that has screen openings (32) arranged in the form of a screen are possible. As material, both for the wire cloth and for the platelike protective screen 28, plastic, metal, ceramic or glass can be used. The platelike protective screen 28 of plastic can be made by injection molding, for instance, or by the making of the screen openings 32 using a material-removing method. The platelike protective screen 28 of metal can for instance be made from sheet metal by stamping, erosion, drilling and so forth, and it can also be provided that the edge elements 33 surrounding the screen openings 32 are bent so that they incline somewhat relative to the screen face 29 (FIGS. 7, 8). If the aspirated air entering the flow conduit 11 of the tubular body 8 contains dirt particles and liquid droplets, then these particles and droplets are deposited in part on the screen face 29 and move primarily toward the downstream end 30 of the protective screen 28; this takes place both on a front face 35 of the screen face 29, oriented counter to the flow direction 5, and on a back face 36 located in the flow direction 5. From the downstream end 30, this liquid deposit 42 (FIGS. 5, 6 and 7) is entrained by the aspirated air, for instance into the outflow opening 31, and adheres predominantly to the inner conduit wall 10, along which the aspirated air causes the liquid, which also contains superfine dirt particles, in the form of superfine liquid droplets or of a thin film of liquid, to flow onward in the flow direction 5, bypassing the measuring element 25, to the tube end 37 downstream of the measurement body 15, from which the deposited liquid separates and is carried to the engine by the surrounding flowing aspirated air.

In FIGS. 5, 6, 7 and 8, details of the protective screens 28 of FIGS. 1–4 are shown on a different scale. In the exemplary embodiment of FIG. 5, the protective screen 28 and the screen openings 32 are inclined with their center lines 41 relative to the flow direction 5 and thus also relative to the center line 7 of the line. When liquid droplets 43, represented by small circles in FIG. 5, and dirt particles entrained in the flow strike the edge elements 33 around the screen openings 32, they form the liquid deposits 42, represented by dashed lines, on the front face 35, and in part migrate through the screen openings 32 to the back face 46, where they slide onward and reach the inner conduit wall 10, or lift away, in the direction of the center line 41 of the screen openings 32, from the protective screen 28 in the direction of the inner conduit wall 10 (see FIG. 7, dashed flight line 45 of the upper liquid droplet 43) Liquid droplets 43 and dirt particles that are carried directly into the screen openings 32 by the air flow strike a screen opening wall 44 and are deflected downstream of the protective screen 28, along a dashed flight line 45 shown by way of example; the flight line 45 is oriented downstream of the protective screen 28 toward the inner conduit wall 10, or in other words bypassing the measurement body 15.

Figure 5:
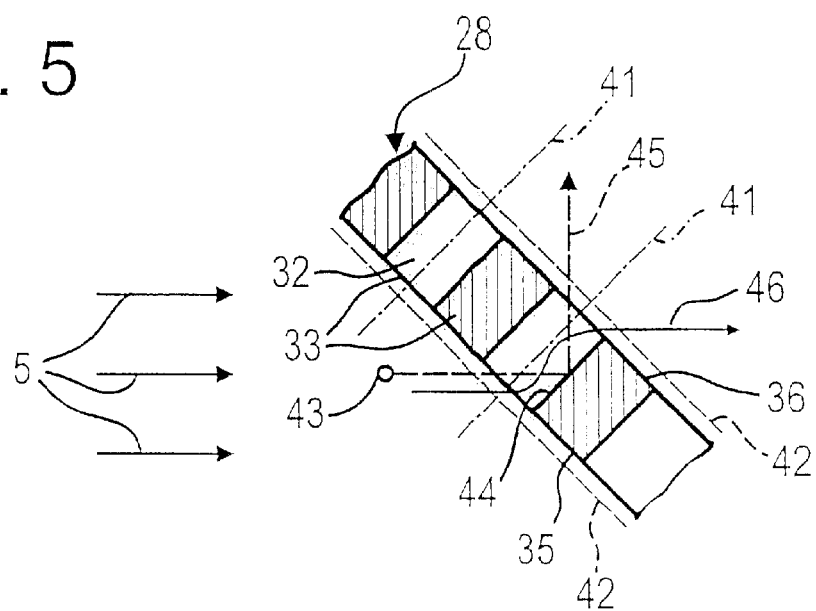
FIGS. 5, 6, 7 and 8 each show one detail of a protective screen on a different scale.
Figure 6:
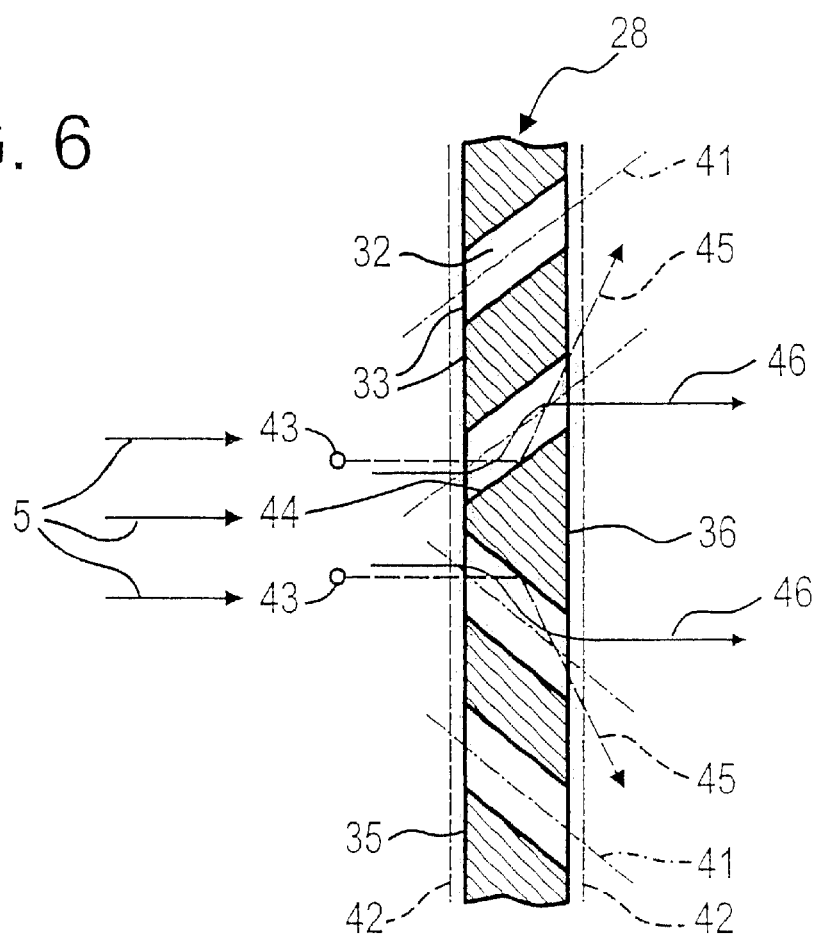

In the exemplary embodiment shown in FIG. 6, although the screen openings 32 are again inclined with their center lines 41 relative to the flow direction 5, nevertheless the protective screen 28 is oriented vertically or virtually vertically to the flow direction 5; however, the same effects with regard to the air flow and the diversion of the liquid droplets 43 and dirt particles result as in the exemplary embodiment of FIG. 5. As also shown in FIG. 6, the inclination of the screen openings 32 with their center lines 41 can be different and can extend in different directions. The liquid that has flowed through the protective screen 28 and been deposited on the inner conduit wall 10 is as a rule distributed, downstream of the outflow opening 31, in addition to the flowing motion in the flow direction 5, in the circumferential direction along the inner conduit wall 10 as well and thus, because of the high flow speed, flows annularly in the form of an extremely thin film bypassing the measurement body 15. In contrast to the dirt particles and liquid constituents 42, 43 that are caught by the protective screen 28 as described, the aspirated air flows virtually unhindered through the screen openings 32, approximately as represented by the solid flow line 46, to the measuring element 25, and the risk that dirt particles and liquid constituents 42, 43 will be deposited is markedly reduced.

In FIGS. 7 and 8, the same reference numerals are used for parts that are the same and function the same as in the previous figures; in addition, the same effects with regard to the air flow 46 and the diversion of the liquid droplets 43 and dirt particles are obtained as in the exemplary embodiments of FIGS. 5 and 6. In the exemplary embodiment shown in FIG. 7, the protective screen 28 is oriented vertically or virtually vertically to the flow direction 5, but by bending or folding of the edge elements 33, the screen openings 32 are inclined with their center lines 41 relative to the flow direction 5. FIG. 8 shows a protective screen 28 as in FIGS. 5, 6 or 7, with screen openings 32 embodied and disposed in honeycomb fashion, which extend in inclined fashion relative to the flow direction 5.

A flow rectifier 38 of known design can be disposed downstream of the tubular body 8, extending transversely to the flow direction 5 through the flow conduit 4 of the line 1 and serving to assure the most uniform possible air flow at and around the measuring element 25, making a more-precise outcome of measurement attainable.

Figure 2:
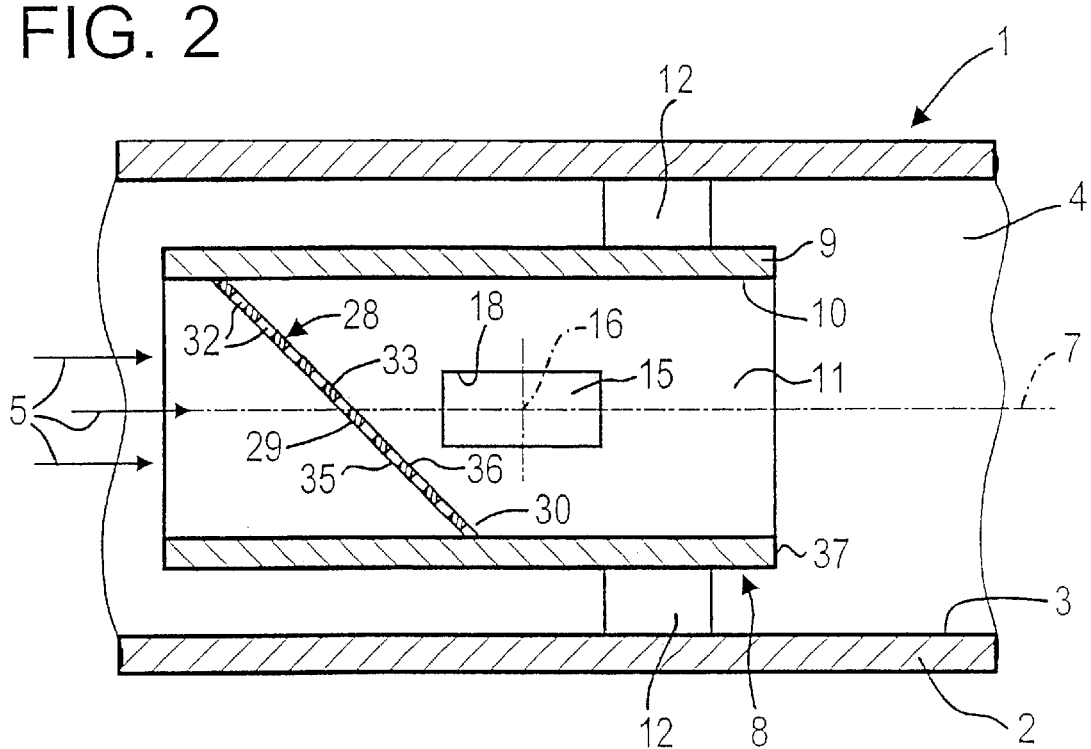
FIG. 2 shows a second exemplary embodiment of a device for measuring the mass of a flowing medium.

In the second exemplary embodiment of the invention, shown in FIG. 2, elements that remain the same and function the same are identified by the same reference numerals. Compared to FIG. 1, in FIG. 2 the line 1 and the tubular body 8 and the measurement body 15 are shown rotated by 90°, so that the measurement body 15 and its longitudinal axis 16 extend perpendicular to the plane of the drawing. In the second exemplary embodiment of FIG. 2, as in the first exemplary embodiment of FIG. 1, the protective screen 28 is disposed in the tubular body 8, extending in inclined fashion in the flow direction 5 from upstream of the measurement body 15 to the measurement body 15, but located only partly upstream of the measurement body 15, so that the downstream end 30 of the protective screen 28 as viewed in the flow direction 5 is located at at least the same height as the measurement body 15. It is thus attained that the liquid and dirt particles diverted from the protective screen 28, on the downstream end 30 in a region of the outflow opening 31, will be deposited on the inner conduit wall 10 of the tubular body 8, where it is assured that the air flowing past will no longer reach the vicinity of the measuring element 25. In the second exemplary embodiment of FIG. 2, the protective screen 28 is disposed in the tubular body 8 in such a way that its defined screen face 29 extends approximately parallel to the longitudinal axis 16 of the measurement body 15. Thus in the second exemplary embodiment of FIG. 2, some of the dirt particles and liquid flows essentially laterally as it bypasses the measurement body 15, while some of these in the first exemplary embodiment of FIG. 1 are carried essentially underneath the measurement body 15, bypassing it. In the second exemplary embodiment of FIG. 2 as well, in which the screen face 29 extends approximately parallel to the longitudinal axis 16, it is possible to dispose the protective screen 28 entirely upstream of the measuring element 25. In both exemplary embodiments, the screen openings 32 can have various shapes; for instance, they can be round or square or rectangular or rhomboid or honeycomblike or oval, or any other geometric shape.

Figure 3:
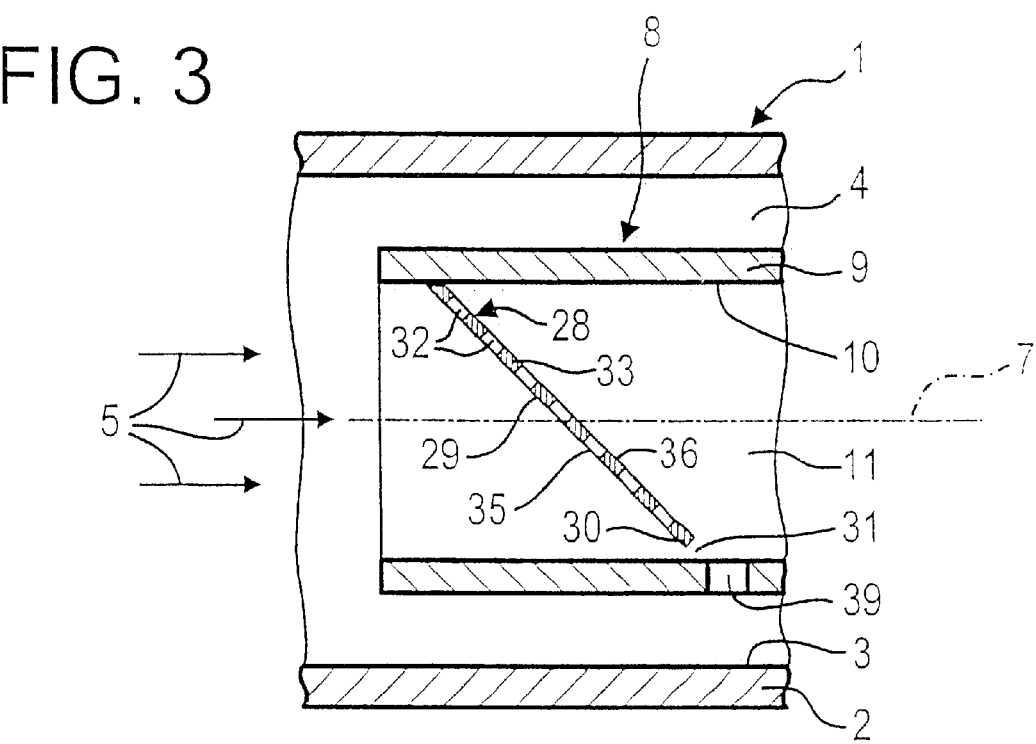
FIG. 3 is a fragmentary view of a device of FIG. 1 or FIG. 2 with a suction extraction opening.
Figure 4:
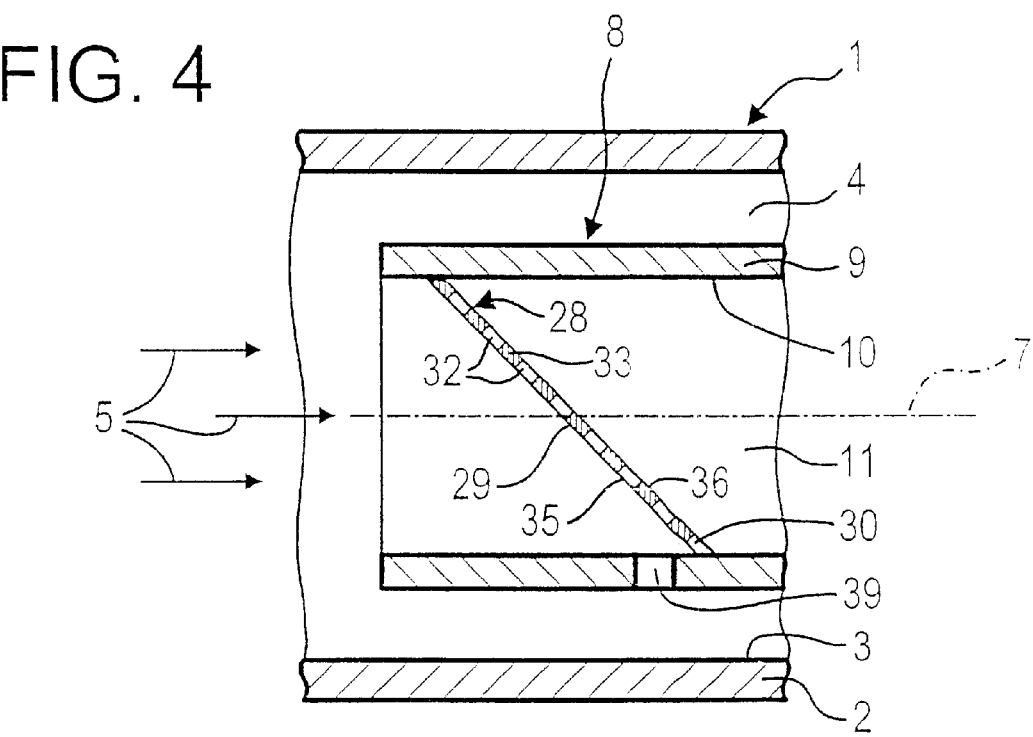
FIG. 4 shows a third exemplary embodiment of a device measuring the mass of a flowing medium in a fragmentary view.

In FIG. 3, in a fragmentary view, the first exemplary embodiment of FIG. 1 is shown, with the parts remaining the same again being identified by the same reference numerals. In addition to the design of the device of FIG. 1, in the device of FIG. 3, downstream of the outflow opening 31 in the wall 9 of the tubular body 8, a suction extraction opening 39 is provided, which penetrates the wall 9 and leads to the line 1 and which, viewed in the flow direction 5, has only a slight spacing from the downstream end 30, and by way of which the liquid and dirt particles diverted via the outflow opening 31 are aspirated toward the flow conduit 4.

The third exemplary embodiment of FIG. 4 again corresponds essentially to the first exemplary embodiment of FIG. 1, but differs from it in that the downstream end 30 of the protective screen 28 does not end before the inner conduit wall 10 but instead extends as far as the inner conduit wall 10, and that upstream, near this downstream end 30 in the inner conduit wall 10 of the tubular body 8, a suction extraction opening 39 leading to the line 1 is provided, by way of which dirt particles and liquid diverted from the protective screen 28 are extracted by suction to the flow conduit 4 of the line 1 without getting downstream of the protective screen 28.

The foregoing relates to preferred exemplary embodiments of the invention, it being understood that other variants and embodiments thereof are possible within the spirit and scope of the invention, the latter being defined by the appended claims.

We claim:

1. In a device for measuring at least one parameter of a medium flowing in a line, in particular the aspirated air mass of an internal combustion engine, having a tubular body, disposed in a line and experiencing the flow of the medium through it in the flow direction, and having a measuring element bathed by the medium and disposed in a flow passage of the tubular body, the flowing medium in the flow passage having regions of flow, at least one of the regions of flow is in contact with the measuring element, the improvement wherein at least partly upstream of the measuring element (25), a protective screen (28) is disposed inside the flow passage (11) of the tubular body (8) and has screen openings (32) with center lines (41), which when the protective screen (28) is disposed in the tubular body (8) extend in inclined fashion relative to the flow direction (5), so that dirt particles and liquid droplets entrained by the flowing medium are diverted downstream of the protective screen (28) into a region of the flowing medium which does not come in contact with the measuring element (25).

2. The device of claim 1, wherein the protective screen (28) extends in inclined fashion in the flow direction (5).

3. The device of claim 1, wherein an open outflow opening (31) is provided between a downstream end (30) of the protective screen (28) and an inner conduit wall (10) of the flow passage (11).

4. The device of claim 3, wherein a suction extraction opening (39) leading to the line (1) is provided downstream of the outflow opening (31) in the wall (9) of the tubular body (8).

5. The device of claim 1, wherein the measuring element (25) is disposed in a measurement body (15), which protrudes into flow passage (11), and the protective screen (28) is located upstream of the measurement body (15).

6. The device of claim 1, wherein the measuring element (25) is disposed in a measurement body (15) that protrudes into the flow passage (11), and a protective screen (28) is located only partly upstream of the measurement body (15).

7. The device of claim 1, wherein the measuring element (25) is disposed in a measurement body (15), which extends along a longitudinal axis (16) and which protrudes through an insertion opening (18) in a first wall portion (23) of the tubular body (8) into the flow passage (11) in the direction of a second wall portion (24) of the tubular body (8), and the protective screen (28) defines a screen face (29) which forms an angle of <90° with the longitudinal axis (16) and is inclined in the direction of the second wall portion (24).

8. The device of claim 1, wherein the measuring element (25) is disposed in a measurement body (15), which extends along a longitudinal axis (16) and which protrudes through an insertion opening (18) in a first wall portion (23) of the tubular body (8) into the flow passage (11) in the direction of a second wall portion (24) of the tubular body (8), and the protective screen (28) defines a screen face (29), which extends approximately parallel to the longitudinal axis (16).

9. The device of claim 1, wherein a flow rectifier (38) is disposed in a line (1) downstream of the tubular body (8).

10. The device of claim 1, wherein between an inner wall (3) of the line (1) and the tubular body (8), at least two flat struts (12) are provided, oriented in the flow direction (5) and transversely to the flow direction (5).

11. The device of claim 1, wherein upstream, near a downstream end (30) of the protective screen (28), a suction extraction opening (39) leading to the line (1) is provided in the wall (9) of the tubular body (8).

12. The device of claim 1, characterized in that the measuring element is embodied as a temperature-dependent measuring element (25).

* * * * *